United States Patent
Knapp

[11] 3,955,759
[45] May 11, 1976

[54] THERMOSTATIC MIXER FOR HYDRAULIC SYSTEMS

[76] Inventor: Alfons Knapp, Bleicherstrasse 3, Biberach an der Riss, Germany

[22] Filed: Oct. 23, 1974

[21] Appl. No.: 517,228

[30] Foreign Application Priority Data
Nov. 28, 1973 Italy .................................. 70491/73

[52] U.S. Cl. .......................... 236/12 R; 137/625.3; 137/625.38; 137/625.4
[51] Int. Cl.[2] ......................................... G05D 23/13
[58] Field of Search ............... 236/12 R; 137/625.4, 137/625.3, 625.38, 90, 604

[56] References Cited
UNITED STATES PATENTS

| | | | |
|---|---|---|---|
| 2,212,343 | 8/1940 | Goehring | 137/625.4 |
| 2,647,692 | 8/1953 | Keller et al. | 236/12 |
| 2,810,523 | 10/1957 | Branson | 236/12 |
| 2,943,792 | 7/1960 | Moen | 236/12 |
| 2,972,356 | 2/1961 | Reynolds | 137/625.4 |
| 3,580,500 | 5/1971 | Quinn | 236/12 |
| 3,792,812 | 2/1974 | Knapp | 236/12 R |

Primary Examiner—William E. Wayner
Assistant Examiner—William E. Tapolcai, Jr.
Attorney, Agent, or Firm—Young & Thompson

[57] ABSTRACT

A thermostatic mixer wherein the apertures intended for inlet of warm water are so conditioned as to oppose to the flow a smaller resistance than the apertures intended for inlet of cold water, thus causing an asymmetric operation of the thermostatic mixer which results in a more rapid correction of accidental increases in temperature.

9 Claims, 5 Drawing Figures

THERMOSTATIC MIXER FOR HYDRAULIC SYSTEMS

BACKGROUND OF THE INVENTION

This invention relates to improvements in or relating to thermostatic mixer devices for hydraulic systems, which devices are intended to be fed by a cold water pipe and a warm water pipe and to deliver water at a predetermined intermediate temperature regulated by a thermostat, which is fed, for exemple, to the various fixtures of a bathroom.

More exactly the invention relates to those types of thermostatic mixers in which a thermometric element immersed in the water of regulated temperature produces the displacement of a throttling member which cooperates with inlet apertures for the cold and the warm water respectively, by modifying in opposite directions the free passages in such a way as to compensate the temperature variations of the regulated water.

With these types of thermostatic mixers, in case of a feeding pressure variation occurring in only one of the inlet pipes, this variation generates a variation of the ratio of the warm water flow to the cold water flow and consequently a variation of the temperature of the delivered water, and the thermometric element has to intervene with a corrective action which, however, is substantially delayed by the thermic inertia.

Now, considerable temporary reductions of the pressure frequently occur in the cold water pipes, especially in consequence of sudden large diversions of water, as for instance those which are caused by actuation of flowmeter valves. These sudden drops of the pressure are not transmitted to the associated warm water pipe because of the hydraulic accumulator effect of the accumulation water heaters which are used generally. Accordingly, when the pressure in the cold water pipe decreases, there occurs for a short but not negligible period of time a delivery of excessively hot water which may produce damage, even serious damage, for instance if at that time a shower is being used.

The reverse phenomenon, i.e. a decrease of the pressure in the warm water pipe, occurs less frequently, because generally no fixtures of high instantaneous consumption of water are inserted in these pipes, and anyhow the consequence of such decrease would be a delivery of water having a lower temperature, which may produce a certain inconvenience, but no damage.

BRIEF SUMMARY OF THE INVENTION

In consideration of the higher frequency and seriousness of consequences of the pressure drops in the cold water pipe as compared with those which occur in the warm water pipes, the object of the present invention is to render asymmetric the operation of the throttling member controlled by a thermometric element in a thermostatic mixer, in such a manner that the throttling action exerted on the flow of the incoming warm water, as a consequence of an increase of the temperature of the regulated water, will be accomplished more rapidly than the reverse action.

This effect can be achieved according to the invention by giving to the inlet apertures for the warm water such a configuration that they oppose to the flow of the water therethrough a resistance which is substantially smaller than that opposed by the inlet apertures for the cold water. Under these circumstances the throttling member, normally, must throttle more the passage of the warm water than the passage of the cold water, in order to maintain the right mixing ratio, instead of assuming normally an almost symmetric position, as occurs with the known thermostatic mixers. It follows that at the moment of the action intended to compensate an increase of the temperature, it is sufficient for the throttling member to move less to reach the new position of equilibrium, and the corrective action can be accomplished in a considerably shorter period of time.

The different resistance opposed to the flow by the apertures for the warm water and the cold water respectively, can be obtained by sizing differently said apertures, or by providing a partial throttling of the same, or also by means of other arrangements capable of enhancing or respectively hindering the flow.

In particular, in the types of mixers having a tubular member for separating the warm water from the cold water, which tubular member is provided with end recesses forming a castellation-like denticulation and defining the apertures for the passage of the water into the interior of the tubular member, wherein the throttling member or distributing valve is slidably mounted, the different resistances may advantageously be obtained by giving different characteristics to the castellation-like denticulations, such as a different width of the recesses or passages between the denticulation projections, the presence of a throttling ring, and so on.

BRIEF DESCRIPTION OF THE DRAWING

The invention will appear more clearly from the following description of illustrative and non limitative embodiments shown diagrammatically in the accompanying drawing, wherein.

DETAILED DESCRIPTION OF PREFERRED EMBODIMENTS

Figure 2:
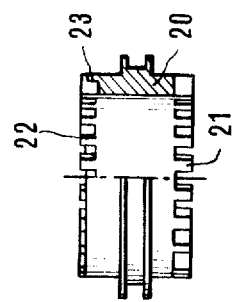
FIG. 2 is a side elevational view, cross-sectional in its right-hand half, of the tubular member configurated in such a manner as to realize the concept of the invention in a first embodiment.

The mixer shown in the drawing comprises a body 1 provided with a union 2 for the incoming warm water, a union 3 for the incoming cold water (this union 3 being shown with dashdotted lines because it is situated outside the plane of the cross-section), and a union 4 for the delivery of water having a regulated temperature. Within the body 1, a tubular member 20 maintained in position by means of a plug 5 separates the flow of warm water from the flow of cold water by means of an annular gasket 19 and allows said flows to enter its interior through end castellation-like denticulations 21 and 22 respectively. Slidable within the tubular member 20 is a cylindrical distributing valve 6 whose end edges define, with respect to the body 1 and the plug 5 respectively, throttled passages for the warm and the cold water respectively, which come in from the respective unions through the denticulations 21 and 22. The distributing valve 6 is connected to a thermometric bulb 7 mounted on a spring 8 in the body 1 and whose position is defined by a threaded member 9 screwed into the plug 5 and having housed therein, in a known manner, a strong safety spring 11. Connected to a tang 10 of the threaded member 9 is a knob 12 which allows one to control the rotation of the threaded member, thereby adjusting the axial position of the threaded member 9, the thermometric bulb 7 and the distributing valve 6 and consequently regulating the temperature which the thermostatic system, thus constituted, tends to maintain in the delivered water which laps the bulb 7. The operation of such thermostatic mixer is well-known in itself and does not need to be described specifically.

On occurrence of an increase of the temperature of the water being delivered, the bulb 7 expands and causes the lowering of the distributing valve 6 which throttles more the passage of the warm water, thereby compensating the temperature increase which has initiated the action of the system.

According to the invention, the passage apertures for the warm water, which in the present case are formed by the denticulation 21, are configurated in such a manner as to oppose to the flow a resistance which is substantially lower than that of the apertures for the cold water, which in the present case are formed by the denticulation 22. It follows that, the other conditions, namely the conditions of the warm and the cold water respectively, being equal, to obtain a determined temperature of the delivered water it is necessary that the position of the distributing valve 6 be adjusted, by means of the knob 12, in such a manner that the passage of the warm water be throttled more than it would be in a prior art mixer, whose inlet apertures for the warm and the cold water oppose a substantially equal resistance. That is to say that the distance of the lower edge of the distributing valve 6 from the cooperating surface of the body 1 is smaller than it would be in the absence of the characteristic according to the invention. It follows that on occurrence of an increase of the temperature of the regulated water, which increase generally is due to a sudden drop of the pressure in the inlet pipe of the cold water, the travel which has to be accomplished by the distributing valve in order to restore the equilibrium is much smaller and can be accomplished in a shorter period of time by virtue of the action of the thermometric bulb 7, thus reducing the disadvantage described in the preamble and limiting its consequences to a possible inconvenience, which, anyhow, will not be accompanied by any danger, or reducing and possibly eliminating altogether such inconvenience.

Figure 3:
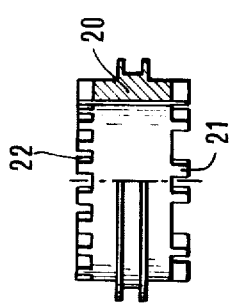
FIG. 3 is a plan view showing the same tubular member, in the upper half of the Figure, as it appears when looking at it from the top and, in the lower half of the Figure, as it appears when looking at it from the underside.

FIGS. 2 and 3 illustrate the way in which the different resistance opposed to the flow by the castellation-like denticulations 21 and 22 may be obtained, for instance, by making equal the projections of the two denticulations, but providing the denticulation 21 for the warm water with a smaller number of projections, which therefore will be spaced by larger passage recesses.

Figure 4:
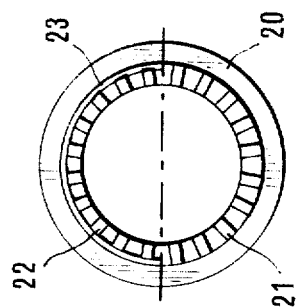
FIGS. 4 and 5 are views, similar to those of FIGS. 2 and 3, but showing a different embodiment of the tubular member.
Figure 5:
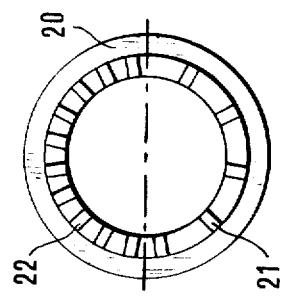
Figure 1:
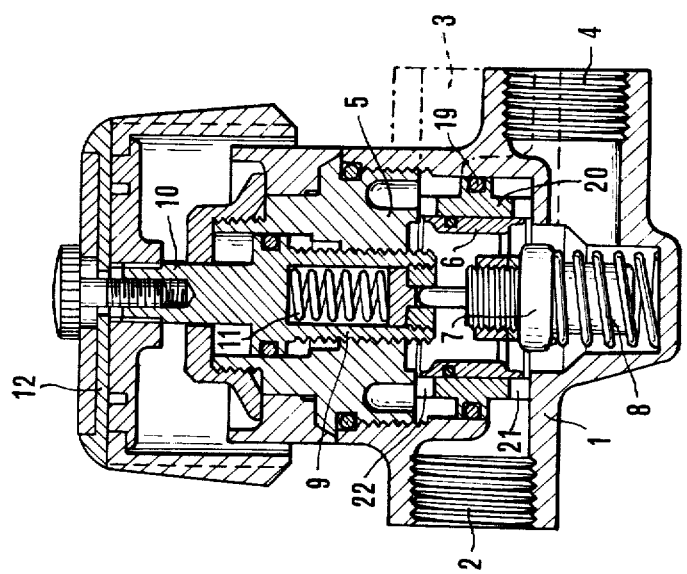
FIG. 1 is an axial cross-sectional view of a thermostatic mixer device, of the type with a tubular separation member having castellation-like denticulations.

FIGS. 4 and 5, instead, illustrate how the same effect may be obtained by making equal the two denticulations 21 and 22, but providing a throttling ring 23 around the denticulation 22 for the cold water.

It is clear that the two provisions described above may also be adopted together, and also that other configurations may be utilized for achieving the desired effect, which configurations will appear obvious to those skilled in the art when becoming acquainted, through the present description, with the objects and means proposed by the invention.

It is to be understood that although a thermostatic mixer of the type provided with a separation tubular member having castellation-like denticulations has been specifically illustrated herein, the concept of the present invention may be applied to mixers having tubular members of different configurations, or without any tubular member at all, or provided with arrangements different from those envisaged herein for the passage and throttling of the warm water and cold water flows, without departing from the scope of the present invention.

Having thus described my invention, what I claim is:

1. In a thermostatic mixer comprising a body, in said body an inlet union for cold water, an inlet union for warm water and a delivery union for mixed water, an inner cavity of said body, communicating with said delivery union, inlet apertures for cold water communicating said inlet union for cold water with said inner cavity, inlet apertures for warm water communicating said inlet union for warm water with said inner cavity, a control valve cooperating with said inlet apertures for cold and warm water in view of modifying in opposite manners the free passages through said respective apertures, and a thermometric element connected to said control valve and immersed in said inner cavity near the communication thereof with said delivery union, said cold inlet and hot inlet apertures being of such area relative to one another that the volume of flow through the cold inlet apertures is less than the volume of flow through the hot inlet apertures when the valve is in symmetric position with respect to said inlet apertures, whereby in normal operation for delivering water at a predetermined temperature the control valve is caused to assume an asymmetric position, proximate to the throttling condition of the inlet apertures for warm water, and thus said control valve is in a condition to rapidly exert the necessary corrective action in case of accidental increase in temperature.

2. A thermostatic mixer as set forth in claim 1, wherein said means for increasing the resistance to the water flow of the inlet apertures for cold water with respect to the inlet apertures for warm water comprises differently sizing said apertures.

3. A thermostatic mixer as set forth in claim 1, wherein said means for increasing the resistance to the water flow of the inlet apertures for cold water with respect to the inlet apertures for warm water comprises a fixed member provided at the apertures for cold water for exerting a partially throttling action.

4. In a thermostatic mixer comprising a body, in said body an inlet union for cold water, an inlet union for warm water and a delivery union for mixed water, an inner cavity of said body, communicating with said delivery union, a tubular member separating said inner cavity from said inlet unions for cold and warm water, both ends of said tubular member having castellation-like denticulations comprising alternate projections and recesses, said denticulations at one end of said tubular member forming inlet apertures for cold water communicating said inlet union for cold water with said inner cavity, and said denticulations at the opposite end of said tubular member forming inlet apertures for warm water communicating said inlet union for warm water with said inner cavity, a control valve cooperating with said inlet apertures for cold and warm water in view of modifying in opposite manners the free passages through said respective apertures, and a thermometric element connected to said control valve and immersed in said inner cavity near the communication thereof with said delivery union, the improvement comprising means for increasing the resistance to the water flow of the inlet apertures for cold water with respect to the inlet apertures for warm water, whereby in normal operation for delivering water at a predetermined temperature the control valve is caused to assume an asymmetric position, proximate to the throttling condition of the inlet apertures for warm water, and thus said control valve is in a condition to rapidly exert the necessary corrective action in case of accidental increase in temperature.

5. A thermostatic mixer as set forth in claim 4, wherein said means for increasing the resistance to the water flow of the inlet apertures for cold water with respect to the inlet apertures for warm water comprises differently sizing the alternate projections and recesses of said castellation-like denticulations.

6. A thermostatic mixer as set forth in claim 4, wherein said means for increasing the resistance to the water flow of the inlet apertures for cold water with respect to the inlet apertures for warm water comprises shaping the castellation-like denticulation forming the inlet apertures for warm water with larger recesses and less projections as compared with the opposite denticulation forming the inlet apertures for cold water.

7. A thermostatic mixer as set forth in claim 4, wherein said means for increasing the resistance to the water flow of the inlet apertures for cold water with respect to the inlet apertures for warm water comprises a peripheral ring member, formed integrally with said tubular member, around the castellation-like denticulation forming the inlet apertures for cold water, partially obstructing said apertures.

8. A thermostatic mixer as set forth in claim 1, and means mounting said control valve for reciprocating movement relative to said inlet apertures for cold and warm water simultaneously to decrease the free passages through said warm water apertures and increase the passages through said cold water apertures upon movement of said control valve in one direction, and simultaneously to decrease the free passages through said cold water apertures and increase said free passages through said warm water apertures upon movement of said control valve in the opposite direction.

9. A thermostatic mixer as set forth in claim 4, and means mounting said control valve for reciprocating movement relative to said inlet apertures for cold and warm water simultaneously to decrease the free passages through said warm water apertures and increase the passages through said cold water apertures upon movement of said control valve in one direction, and simultaneously to decrease the free passages through said cold water apertures and increase said free passages through said warm water apertures upon movement of said control valve in the opposite direction.

* * * * *